United States Patent [19]

Glamos

[11] Patent Number: 5,174,060
[45] Date of Patent: Dec. 29, 1992

[54] PLANT SUPPORTS WITH RIGIDLY ATTACHED HELICALLY COILED SUPPORT MEMBER

[76] Inventor: Joseph E. Glamos, 14535 Ostlund Trail, Marine/St. Croix, Minn. 55047

[21] Appl. No.: 618,060

[22] Filed: Nov. 26, 1990

[51] Int. Cl.⁵ .............................................. A01G 17/06
[52] U.S. Cl. ...................................................... 47/45
[58] Field of Search .......................... 47/44, 45, 47, 70; 52/653; 248/175, 153

[56] References Cited

U.S. PATENT DOCUMENTS

| | | |
|---|---|---|
| 85,244 | 12/1868 | Rowley . |
| 417,838 | 12/1889 | Richards . |
| 1,018,157 | 2/1912 | Black ...................................... 47/45 |
| 1,024,910 | 4/1912 | Sanford ................................. 52/653 |
| 2,000,911 | 5/1935 | Balousek . |
| 2,083,526 | 6/1937 | Rinker . |
| 2,577,373 | 12/1951 | Smith . |
| 3,239,171 | 3/1966 | Binyon . |
| 4,860,489 | 8/1989 | Bork . |
| 4,984,407 | 1/1991 | Ziehmer .............................. 52/653 |
| 5,048,231 | 9/1991 | Brown .................................. 52/653 |

FOREIGN PATENT DOCUMENTS

| | | | |
|---|---|---|---|
| 908890 | 4/1946 | France ................................. 52/653 |
| 74230 | 2/1954 | Netherlands ........................... 47/45 |
| 361547 | 11/1931 | United Kingdom .................... 47/47 |

Primary Examiner—Henry E. Raduazo
Attorney, Agent, or Firm—Kinney & Lange

[57] ABSTRACT

A plant support comprising a plurality of substantially straight legs surrounded by and welded to a helically coiled support member is disclosed. The plant support of the present invention offers the advantages of good structural rigidity combined with simplicity of design well suited for low-cost automated manufacturing methods.

12 Claims, 3 Drawing Sheets

PLANT SUPPORTS WITH RIGIDLY ATTACHED HELICALLY COILED SUPPORT MEMBER

BACKGROUND OF THE INVENTION

This invention relates to plant supports. In particular, the present invention relates to a plant support having a helically coiled support member rigidly fastened to a plurality of legs.

Agricultural production of some species of flora (tomatoes, grapes, cucumbers, etc.) can be increased when the plants are provided with a support structure. In particular, plants that yield heavy fruitation but tend to have relatively weak stems and branches are prone to breakage in high winds and heavy rains. In some species, such as tomatoes, even if breakage does not occur, heavy yield losses can occur when branches bend and place the fruit in contact with the ground where it spoils.

Plant support structures can further improve yields by guiding plant growth upwards and reducing spreading, thus allowing more plants to be grown in a given area. This is particularly true of vines such as grapes and cucumbers.

Thus, plant supports can serve both to guide plant growth in a desired direction and help prevent losses due to breakage and spoiling. Smith U.S. Pat. No. 2,577,373 has also noted that the base of a plant support can improve yields by delineating a boundary and preventing overly close cultivation and irrigation furrowing which results in root damage.

The prior art includes Bork U.S. Pat. No. 4,860,489, which discloses a cylindrically-shaped plant support composed of two stakes to which a helical spring can be adjustably mounted. However, the Bork reference discloses a relatively expensive device composed of seven individually manufactured subcomponents. The competitive nature of agricultural production precludes overly costly support structures such as the one disclosed in the Bork reference.

Other examples of prior art include Smith U.S. Pat. No. 2,577,373 and Rinker U.S. Pat. No. 2,083,526. Both Smith and Rinker disclose plant supports, the body of which consists solely of helically wound springs. While inexpensive to manufacture, these configurations suffer from excessive flexibility. The lack of rigidity disclosed in both the Smith and Rinker references can result in plant breakage under high wind load conditions.

Finally, Binyon U.S. Pat. No. 3,239,171, Balousek U.S. Pat. No. 2,000,911 and Richards U.S. Pat. No. 417,838 all disclose plant supports composed of a single central stake to which bent wires and some variant of a spiral or helical shape have been attached. One problem with this configuration is that wind induced oscillations can easily cause the stake to work loose from the ground, eventually offering the plant little or no support. Another problem with the central stake is that its insertion can cause root damage (a problem also inherent in the Rinker reference).

SUMMARY OF THE INVENTION

The present invention is a plant support comprised of a plurality of legs around which a helically coiled member is wrapped. One end of the helically coiled member is shaped into a lower ring and welded to each leg. The other end of the coiled member is formed into an upper ring and also welded to each leg. Finally, the coiled member is welded to each leg at each coil-to-leg contact point between the lower ring end and the upper ring end. Each leg projects below the lower ring for insertion into the ground.

In addition to having good structural integrity, the present invention can be easily manufactured using automatic machinery. The simplicity of design which allows this automatic manufacture offers a significant cost saving over the prior art. Finally, when the lower ring is smaller than the upper ring, the resulting conical shape allows nesting of multiple plant supports into one another for space savings during transport and storage.

DETAILED DESCRIPTION OF THE PREFERRED EMBODIMENTS

Figure 1:
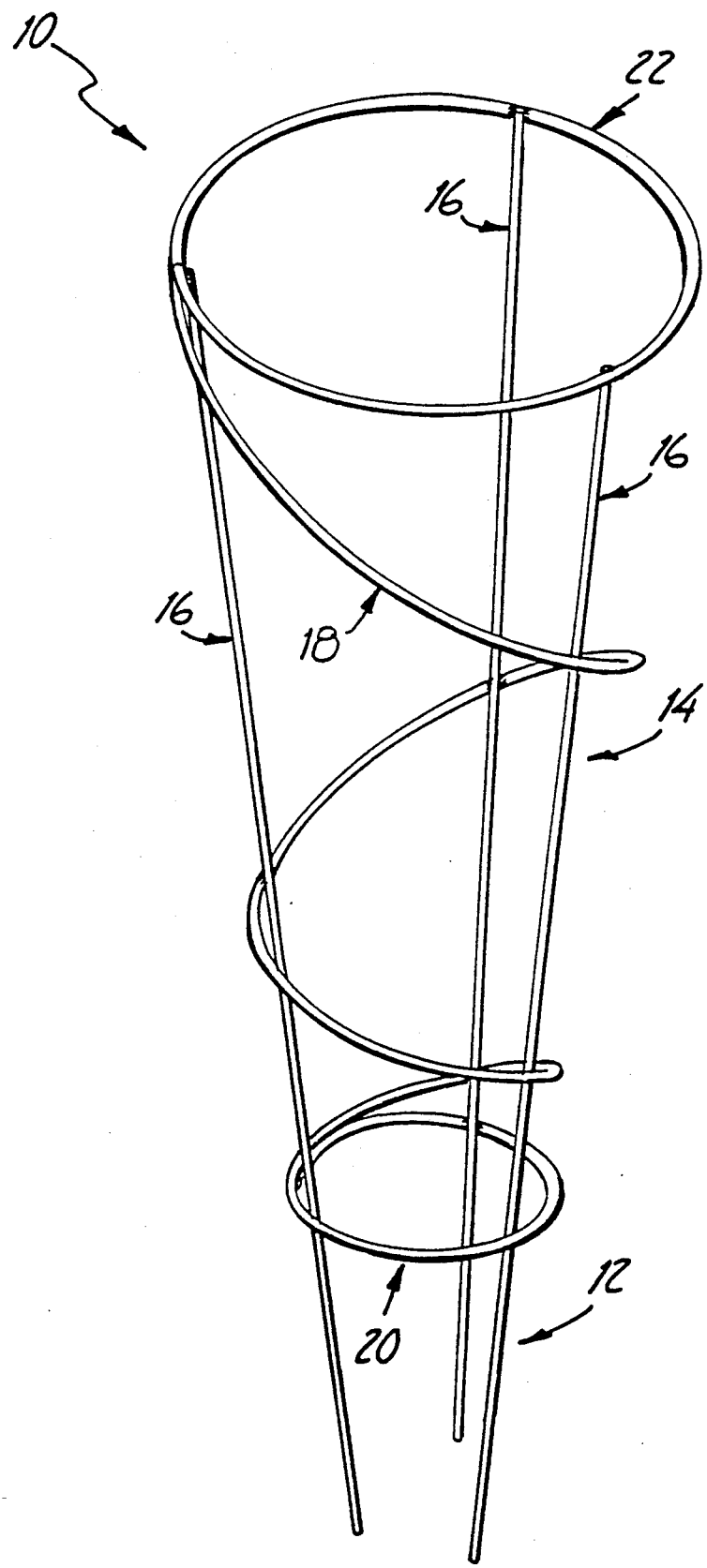
FIG. 1 is a perspective view of a first preferred embodiment of the present invention.

FIG. 1 illustrates a first embodiment of plant support 10, which includes lower section 12 and upper section 14. A plurality of substantially straight legs 16 are positioned equidistantly about the periphery of the generally conically-shaped structure of plant support 10. Straight legs 16 extend from the top of the upper section 14 to lower section 12, where they project out and provide means for anchoring the plant support into the ground.

Upper section 14 incorporates helically coiled member 18 welded to straight legs 16. The lower end of helically coiled member 18 is formed into smaller lower ring 20. The upper end of helically coiled member 18 is formed into larger upper ring 22.

Straight legs 16 are welded to both lower ring end 20 and upper ring end 22 of helically coiled member 18. Straight legs 16 can also be welded to the central portion of helically coiled member 18 between lower ring end 20 and upper ring 22 at each point of leg-to-coil contact.

Plant support 10 is formed from steel coil stock ranging in diameter from, for example, 0.120 inches to 0.148 inches (11 gauge to 9 gauge). The coil stock is purchased from a steel mill and comes as a continuous length of wire wrapped around a tube or wood frame called a "stem."

Plant support 10 is particularly suited for manufacture using automatic machinery. During production, three or more legs are fed to a suitable fixture either from one coil, or all at once from several coils.

After the legs are fed into the fixture and secured, they are cut to length automatically. The helically coiled member 18 is then wrapped around straight legs 16 and simultaneously welded as it is wrapped. Wrapping and welding of the helically coiled member 18 can be undertaken either from the smaller lower ring 20 end to the larger upper ring 22 end or vice versa.

The legs 16 secured in the fixture are rotated to facilitate wrapping and welding of the helically coiled member 18. The spacing of the helically coiled member's coils is controlled either by indexing of the legs and holding the spiral feed in place, or by indexing the spiral feed and holding the legs in place as they rotate.

Automatic production of plant support 10 also preferably entails automatic removal of the completed plant support structure from the production fixture and insertion of plant supports into one another, forming a bundle of, for example, twenty-five supports. Finally, the bundles are tied and labelled automatically.

Figure 2:
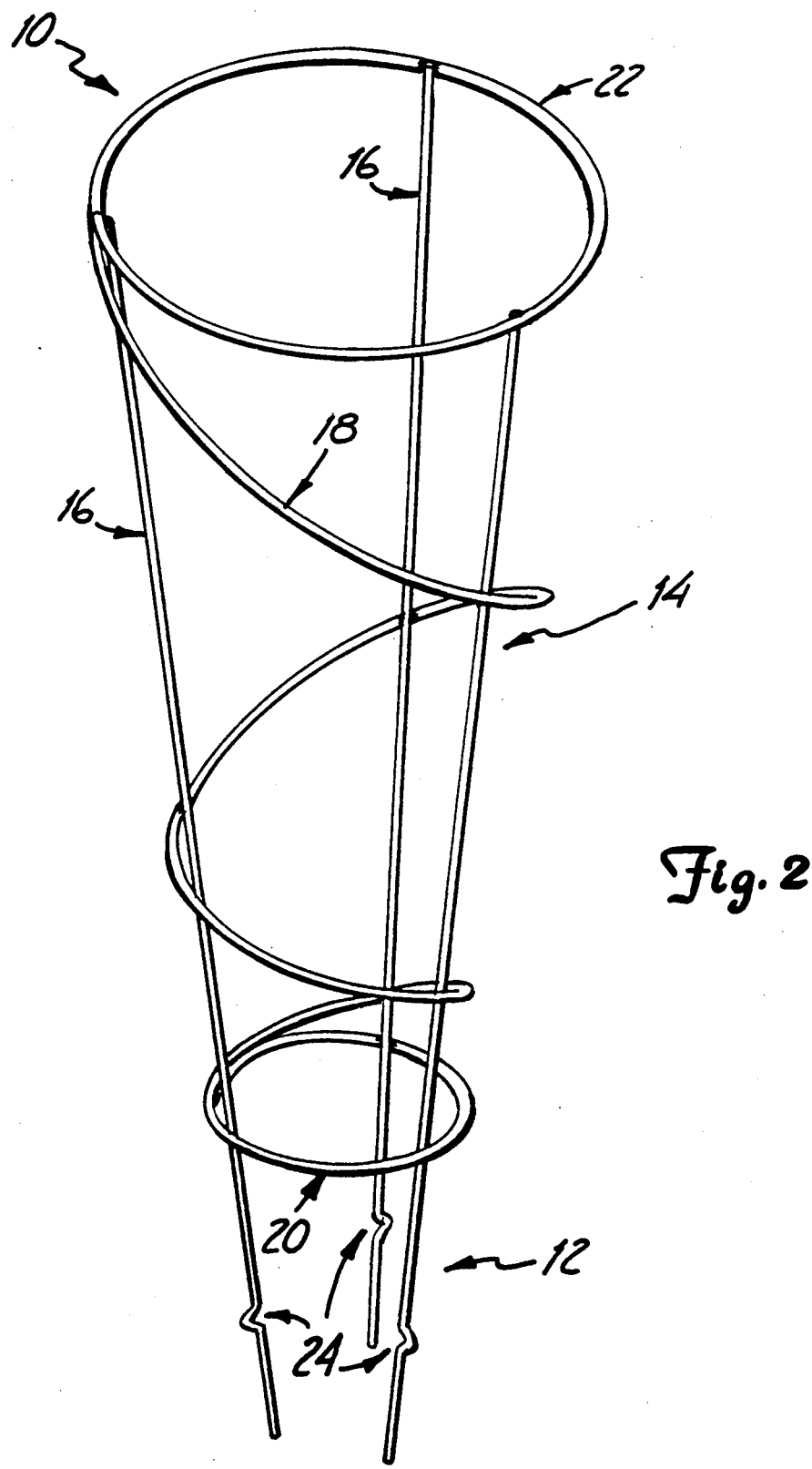
FIG. 2 is a perspective view of a second preferred embodiment of the present invention.

Plant support 10 made in accordance with the second preferred embodiment of the present invention is shown in FIG. 2. The embodiment shown in FIG. 2 is essentially similar to the embodiment shown in FIG. 1, except for the addition of bends 24 in legs 16. Similar reference numerals are used to designate similar elements. Bends 24 act to enhance anchoring of plant support 10 in the ground when the portions of legs 16 comprising lower section 12 are inserted into the ground.

Figure 3:
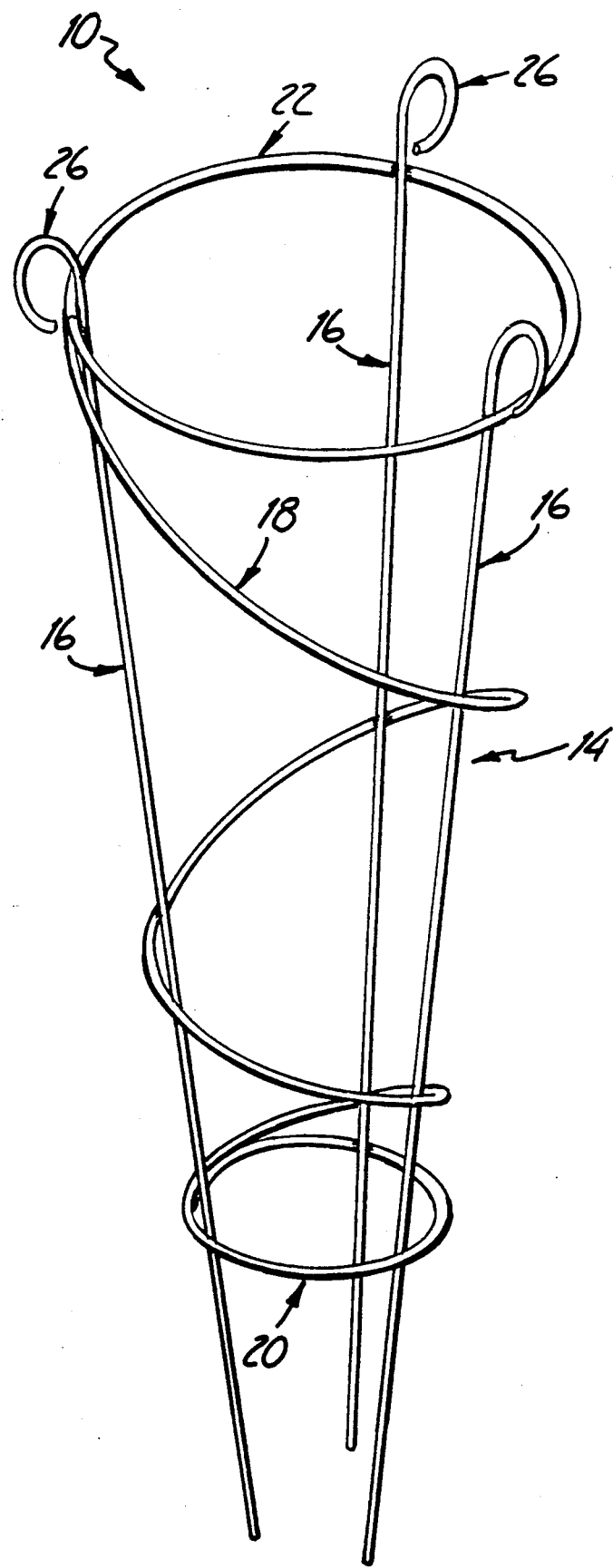
FIG. 3 is a perspective view of a third preferred embodiment of the present invention.

Plant support 10 made in accordance with the third preferred embodiment of the present invention is shown in FIG. 3. The embodiment shown in FIG. 3 is essentially similar to the embodiment shown in FIG. 1, except that legs 16 project beyond upper ring 22 of helically coiled member 18. The projections 26 can be straight or bent (as shown) to provide additional tying space for the upper portions of a tall plant or for decorative purposes.

The additional features shown in the embodiments of FIGS. 2 and 3 can be combined in the same plant support. The plant support need not be conical but can, for example, be cylindrical or hour-glass shaped. If conical, the plant support taper towards the top rather than narrowing toward the bottom, as shown in FIGS. 1-3. Finally, the plant support of the present invention can have less or more than the three legs shown in the preferred embodiments of the present invention.

Although the present invention has been described with reference to preferred embodiments, workers skilled in the art will recognize that changes may be made in form and detail without departing from the spirit and scope of the invention.

What is claimed is:

1. A plant support comprising:
a plurality of substantially straight legs positioned equidistantly about a central axis; and
a coiled member surrounding the legs and welded to the legs, the coiled member having a terminating lower end in the shape of a ring welded to the legs, a terminating upper end in the shape of a ring welded to the legs, and a helically wound central portion between the upper end and the lower end, wherein the substantially straight legs project below the lower end of the coiled member for insertion in the ground and anchoring the plant support therein.

2. The plant support of claim 1 wherein the portions of the straight legs projecting below the lower end of the coiled member incorporate additional bends therein, the bends serving to enhance anchorage of the plant support in the ground.

3. The plant support of claim 1 wherein the terminating lower end ring of the coiled member has a diameter differing from a diameter of the terminating upper end ring of the coiled member.

4. The plant support of claim 3 wherein the helically wound central portion of the coiled member is in the shape of a conical helix.

5. The plant support of claim 1 wherein the terminating lower end ring of the coiled member has the same diameter as the diameter of the terminating upper end ring of the coiled member.

6. The plant support of claim 5 wherein the helically wound central portion of the coiled member is in the shape of a cylindrical helix.

7. The plant support of claim 1 wherein the substantially straight legs project upwards, beyond the terminating upper end ring of the helically coiled member.

8. The plant support of claim 7 wherein portions of the substantially straight legs projecting beyond the terminating upper end ring of the helically coiled member incorporate bends therein.

9. The plant support comprising:
a plurality of substantially straight legs positioned equidistantly about a central axis; and
a coiled wire member surrounding the straight legs and welded thereto at a plurality of points of intersection, the coiled member terminating in a small ring at its lower end and a large ring at its upper end, the coiled member forming a conical helix, wherein the legs project below the small ring for insertion in the ground and anchoring the plant support therein.

10. The plant support of claim 9 wherein portions of the legs projecting below the small ring have bends therein.

11. The plant support of claim 9 wherein the straight legs project above the large ring.

12. The plant support of claim 11 wherein portions of the legs extending above the large ring have bends therein.

* * * * *